United States Patent [19]

Hertel et al.

[11] Patent Number: 5,304,338
[45] Date of Patent: Apr. 19, 1994

[54] CARBON FIBER REINFORCED POLYIMIDE COMPOSITES

[75] Inventors: Christopher J. Hertel, Glastonbury; Charles R. Watson, Windsor; Jeffrey S. LeShane, Glastonbury, all of Conn.

[73] Assignee: United Technologies Corporation, Hartford, Conn.

[21] Appl. No.: 862,663

[22] Filed: Apr. 2, 1992

[51] Int. Cl.$^5$ .............................................. B29C 45/02
[52] U.S. Cl. ........................ 264/328.4; 264/328.14; 264/328.17; 264/331.19
[58] Field of Search ............. 264/328.1, 331.16, 328.4, 264/331.19, 328.5, 328.14, 328.16, 328.17

[56] References Cited

U.S. PATENT DOCUMENTS

| | | | |
|---|---|---|---|
| 4,146,668 | 3/1979 | Dorey et al. | 428/283 |
| 4,356,228 | 9/1982 | Kobayashi et al. | 428/283 |
| 4,370,115 | 1/1983 | Miura | 425/549 |
| 4,485,140 | 11/1984 | Gannett et al. | 428/260 |
| 4,506,100 | 3/1985 | Schoenberg et al. | 564/430 |
| 4,576,857 | 3/1986 | Gannett et al. | 428/260 |
| 4,663,230 | 5/1987 | Tennent | 428/367 |
| 5,087,644 | 2/1992 | Tsutsumi et al. | 528/205 |
| 5,120,814 | 6/1992 | Seidl et al. | 264/331.16 |
| 5,138,028 | 8/1992 | Paul et al. | 528/353 |

*Primary Examiner*—Jay H. Woo
*Assistant Examiner*—Robert B. Davis
*Attorney, Agent, or Firm*—Charles E. Sohl

[57] ABSTRACT

A substantially microcrack- and blister-free composite can be made by drying an addition-type polyimide molding compound under suitable conditions to remove excess moisture. The molding compound includes a mixture of a polyimide resin and a plurality of carbon reinforcing fibers less than 3 mm long. The molding compound is placed into a heated material reservoir and transferred to a heated molding tool with a heated transfer ram. The ram establishes a molding pressure in a mold cavity in the molding tool sufficient to cure the molding compound into the desired composite. The molding compound is transferred to the mold cavity such that the molding compound is heated to a molding temperature at a rate of at least about 85° C./min. The molding pressure and temperature are maintained in the mold cavity for a time sufficient to cure the molding compound into the desired composite. The composite is cooled and then heated to a suitable post-cure temperature at a rate sufficient to permit residual volatiles in the composite to diffuse out of the composite. The composite is held at the post-cure temperature for a sufficient time and then cooled. The invention also includes an article made by this method and a vented molding tool used in the method.

8 Claims, 1 Drawing Sheet

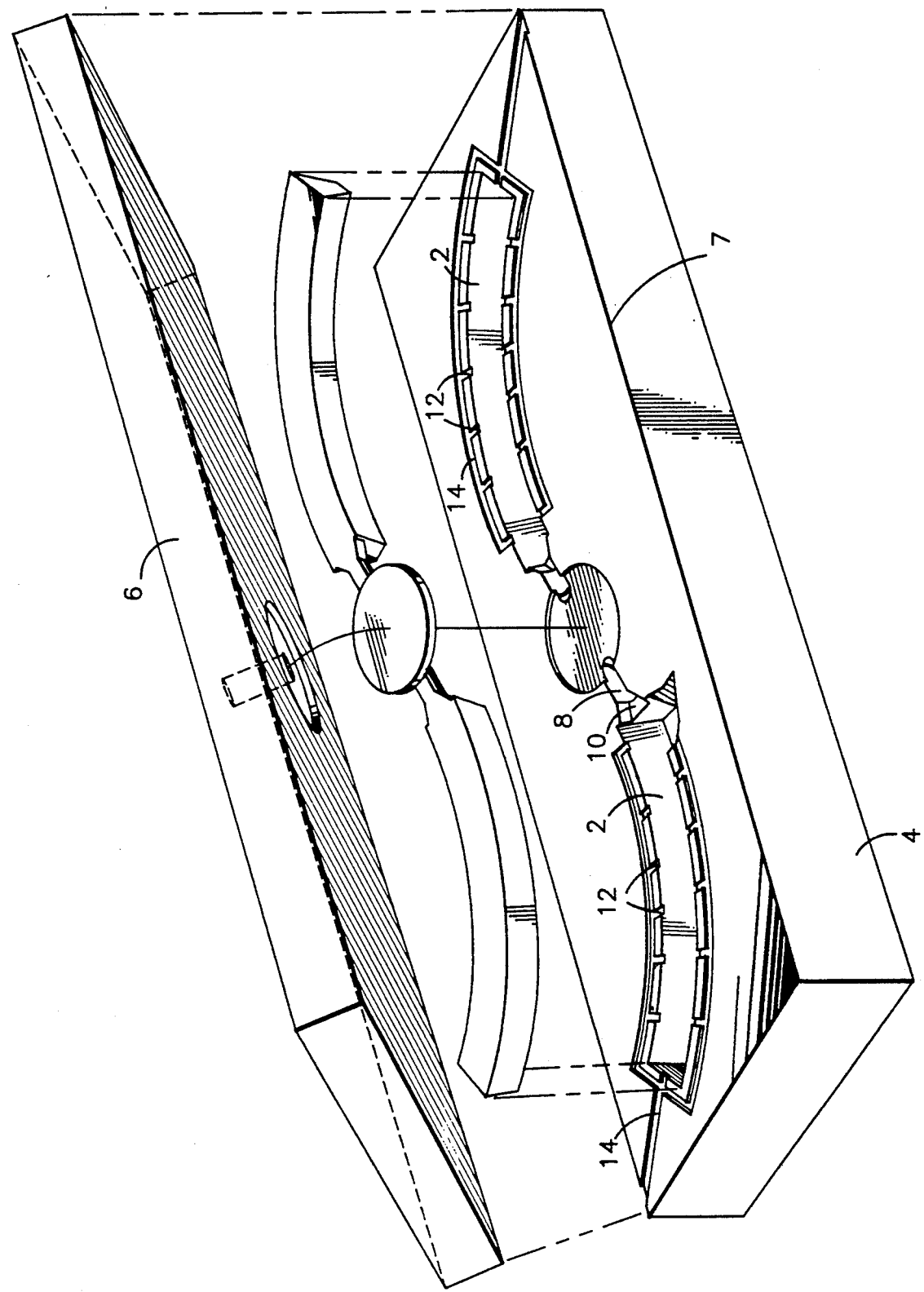

CARBON FIBER REINFORCED POLYIMIDE COMPOSITES

DESCRIPTION

1. Technical Field

The present invention is directed to a method for making carbon fiber reinforced polyimide composites.

2. Background Art

In recent years, polyimide materials and composites have replaced metals for various applications in aerospace and other industries. These materials are desirable because of their light weight and resistance to chemical attack.

Polyimide composites comprise a polyimide matrix and one or more fillers disposed in the matrix. Many different polyimide resins can be used as matrices for polyimide composites. Polyimides derived from polymerizable monomeric reactant (PMR) resins have been particularly popular. PMR resins initially consist of the monomethylester of 5-nornbornene-2,3-dicarboxylic acid (NE), the dimethyl ester of 3,3',4,4'-benzophenone tetracarboxylic acid (BTDE), and 4,4'-methylene dianiline. Combining the monomers in different mole ratios produces PMR resins of varying molecular weights. For example, combining the monomers in a mole ratio of 2:2.087:3.087 produces a resin, known as PMR-15, that has a molecular weight of about 1500 when imidized. The "15" in the material's name indicates the material's nominal molecular weight. The fillers disposed in the matrix can be any conventional materials, including graphite powder and carbon fibers that are typically longer than 3 mm (0.125 inches).

Polyimide composites can be made into useful articles in several ways. One common method is compression molding in which a molding compound, a mixture of the matrix resin and filler, is placed in a molding tool. The molding compound is subjected to heat and pressure to shape and cure it into a desired article. The composite is often post-cured by heating it in discrete steps to remove volatiles that can damage the matrix under later use. Although compression molding is very convenient, it can only make composites that have simple shapes. Polyimide composites also can be made by transfer molding. Unlike compression molding, transfer molding can easily produce complex-shaped composites. In transfer molding, the molding compound is placed into a material reservoir where it is heated to a temperature at which it will flow. A ram transfers the molding compound from the material reservoir to a suitably shaped molding tool where the molding compound cures under elevated temperature and pressure to form a desired article. After curing, the composite can be post-cured to remove volatiles.

Although polyimide composites made with the materials and methods described above can have acceptable properties, they can develop undesirable matrix microcracks and blisters. In addition, the prior art methods used to make the composites can require significant amounts of time to produce acceptable articles. Therefore, what is needed in the industry are polyimide composites that are substantially free of matrix microcracks and blisters and a quicker method of making the composites.

DISCLOSURE OF THE INVENTION

The present invention is directed to polyimide composites that are substantially free of matrix microcracks and blisters and a method of making the composites that is quicker than prior art methods.

One aspect of the invention includes a method of making substantially microcrack-and blister-free composites by transfer molding. A molding compound that comprises a mixture of a polyimide resin and a plurality of carbon reinforcing fibers less than 3 mm long is dried under suitable conditions to remove excess moisture. A transfer molding apparatus is heated to a molding temperature sufficient to cure the molding compound into a desired composite within a convenient time. The transfer molding apparatus includes a material reservoir, a transfer ram, and a molding tool. The molding tool has a plurality of vents connected to a passage that permit volatiles in the molding tool to escape from the molding tool. The molding compound is placed into the heated material reservoir where it softens into a viscous material. The viscous molding compound is transferred from the material reservoir to a mold cavity in the heated molding tool with the heated transfer ram to establish a molding pressure in the mold cavity sufficient to cure the molding compound into the desired composite within a convenient time. The viscous molding compound is transferred to the mold cavity such that the viscous molding compound is heated to the molding temperature at a rate of at least about 85° C./min. The molding pressure and temperature are maintained in the mold cavity for a time sufficient to cure the molding compound into the desired composite. Volatiles produced while the molding compound cures are removed through the vents in the molding tool. The composite is cooled to a temperature suitable for starting a post-cure procedure and heated to a suitable post-cure temperature at a rate sufficient to permit residual volatiles in the composite to diffuse out of the composite. The composite is maintained at the post-cure temperature for a time sufficient to ensure that residual volatiles are removed from the composite and then cooled.

Another aspect of the invention includes an article made by the above method.

Another aspect of the invention includes a transfer molding tool that includes a runner, a gate, a mold cavity, a plurality of vents spaced around the perimeter of the mold cavity, and a passage connecting the vents. The vents permit volatiles to escape from the mold cavity and the passage directs escaping volatiles out of the transfer molding tool.

These and other features and advantages of the present invention will become more apparent from the following description and accompanying drawing.

BRIEF DESCRIPTION OF THE DRAWING

The FIGURE is an isometric view of a molding tool of the present invention.

BEST MODE FOR CARRYING OUT THE INVENTION

The composite of the present invention comprises a polyimide matrix and a plurality of short, chopped carbon fibers disposed in the matrix. The matrix can comprise any polyimide or mixture of polyimides that has an upper use temperature of at least about 315° C. (600° F.). For many applications, the upper use temperature is at least about 30° C. (50° F.) below the polyimide's glass transition temperature. Typical addition-type polyimides that are suitable for the present invention include PMR-15, PMR-17, PMR-20, PMR-II-30, PMR-II-50, PMR-II-70, AFR-700, and LARC-160. These materials are readily available from commercial sources such as Dexter Composites (Cleveland, Ohio). Commonly, the matrix material will initially be in the form of coarse particles, such as particles with a nominal diameter of about 5 mm (0.1875 inches), that are at least partially imidized.

The short carbon fibers reinforce the matrix without producing matrix mircocracks or blisters. Typically, the fibers have a diameter of about 5 $\mu$m to about 7 $\mu$m and are less than about 3 mm (0.125 inches) long. The carbon fibers should have a tensile strength of at least about 3.1 GPa (450 ksi), a tensile elongation of at least about 1.0%, a tensile modulus of at least about 207 GPa (30 Msi). Preferably, the fibers will be less than about 2 mm long and, most preferably, about 1 mm long. The fibers should have a polyimide sizing or no sizing. Suitable fibers include IM-S fiber (Grafil Co., Pittsburg, Calif.), G-40 fiber (BASF, Anaheim, Calif.), and T-40 fiber (Amoco Performance Products, Ridgefield, Conn.). If desired, additional reinforcing phases, such as graphite powder or other conventional fillers, can be added to the matrix. Graphite powder used with the present invention should have a minimum carbon content of about 96 weight percent (wt %). Suitable graphite powder is available from several commercial sources.

To expedite the molding process, the composite's constituents should be mixed in suitable proportions to form a molding compound. A person skilled in the art will understand that the present invention is compatible with a wide range of molding compound compositions. Suitable molding compounds comprise up to about 99 wt % polyimide resin, up to about 70 wt % chopped carbon fibers, and up to about 10 wt % graphite powder. A preferred molding compound comprises about 64 wt % to about 66 wt % polyimide resin, about 29 wt % to about 31 wt % chopped carbon fibers, and about 3 wt % to about 5 wt % graphite powder. A suitable molding compound based on an imidized PMR-15 resin can be obtained from Dexter Composites (Cleveland, Ohio).

The molding compound should be dried under any suitable conditions to remove excess moisture. For example, it can be heated to a temperature between about 135° C. (275° F.) and about 163° C. (325° F.) for about 0.5 hours (hr) to about 4 hr. Preferably, the molding compound will be dried at about 150° C. (300° F.) for about 0.5 hr. If desired, the molding compound can be dried at a lower temperature for a longer time or under a vacuum. The drying step also preheats the molding compound. While the molding compound is dried, a molding apparatus, including a material reservoir, a transfer ram, and a molding tool, should be preheated to a molding temperature sufficient to cure the molding compound into a desired composite within a convenient time. For a PMR-15 matrix, the molding temperature can be about 300° C. (575° F.) to about 330° C. (630° F.). Preferably, the molding temperature will be about 300° C. (600° F.). If more than one part will be produced on the same apparatus in sequence, the apparatus should be held at the molding temperature throughout the part run. Holding the apparatus at the molding temperature eliminates intermediate cooling and reheating steps that are part of prior art methods. By eliminating these steps, the method of the present invention can make more parts in a given time than prior art methods.

After drying, the molding compound is placed into the preheated material reservoir where it softens into a viscous material. The preheated transfer ram transfers the viscous molding compound into the preheated molding tool with a pressure sufficient to establish a molding pressure in a mold cavity in the molding tool that is sufficient to cure the molding compound into the desired composite within a convenient time. For a PMR-15 matrix, the transfer ram pressure should be at least about 13.8 MPa (2 ksi). Preferably, the transfer ram pressure will be at least about 20.7 MPa (3 ksi) and, most preferably, about 24.1 MPa (3.5 ksi). The transfer should be completed in sufficient time such that the viscous molding compound is heated to the molding temperature at a rate of at least about 85° C./min (150° F./min). Preferably, the heat-up rate will be at least about 110° C./min (200° F./min) and, most preferably, at least about 167° C./min (300° F./min). If the molding temperature is greater than about 315° C. (600° F.), the transfer ram should be momentarily withdrawn after the molding compound has been packed into the mold cavity to release air and volatiles trapped in the mold cavity. For example, the transfer ram can be withdrawn for up to about 45 sec. Preferably, the transfer ram will be withdrawn for about 30 sec. The molding pressure should then be reestablished. The molding pressure and temperature should be maintained for a sufficient time to cure the molding compound into the desired composite. For a PMR-15 matrix, the molding compound should be cured for about 0.5 hr to about 2 hr. Preferably, the molding compound will be cured for about 1.5 hr. After curing, the composite is removed from the mold, cooled to a temperature suitable for starting a post-cure procedure, and heated to a suitable post-cure temperature at a rate sufficient to permit residual volatiles in the composite to diffuse out of the composite. If the residual volatiles are not removed, they can cause the matrix to blister when it is exposed to elevated temperatures. The specific temperatures and heating rates depend on the composition of the matrix. For example, a composite with a PMR-15 matrix can be cooled to about 205° C. (400° F.) and then heated to a suitable post-cure temperature at a rate of about 2° C./hr (4° F./hr) to about 7° C./min (13° F./min). Preferably, the composite will be heated to about 315° C. (600° F.) at a rate of about 2° C. (4° F.)/hr to about 4° C./hr (7° F./hr) for post-curing. The composite should be held at the post-curing temperature for a time sufficient to ensure that all volatiles are removed from the composite. For example, the composite can be post-cured for about 16 hr. The composite is then cooled.

A key feature of the present invention is the design of the molding tool used to make the desired composite. A molding tool of the present invention, shown in the Figure, has at least one mold cavity 2 formed in cooperating tool halves 4, 6. The mold cavity 2 shapes the composite during the transfer and curing steps. A runner 8 and gate 10 convey the molding compound from the transfer ram (not shown) to the mold cavity 2. The runner 8 and gate 10 should have a cross-sectional area that is about 20% to about 80% of the cross-sectional area of the mold cavity. Preferably, the runner 8 and gate 10 will have a cross-sectional area of about 50% to about 70% of the mold cavity. Most preferably, the runner 8 and gate 10 will have a cross-sectional area of about 60% of the mold cavity. When placed together, the tool halves 4, 6 form a parting line 7 at their interface. In prior art molding tools, volatiles produced while the molding compound cured were vented through the parting line 7. The parting line 7, however, is inadequate to vent all the volatiles when the heat-up rate is as rapid as in the method of the present invention. Volatiles that cannot escape from the mold cavity 2 form undesirable blisters on the composite. The molding tool of the present invention overcomes this problem by providing a series of vents 12 spaced along the perimeter of the mold cavity 2 at the surface of tool half 4 that permits the volatiles to escape. The vents 12 are connected to a passage 14 that directs escaping volatiles out of the tool. The size of vents 12 needed to allow volatiles to escape is a function of the size of the mold cavity 2. The combined width of all the vents should be at least about 10% of the mold cavity's perimeter. Preferably, the combined width of the vents 12 will be about 25% of the mold cavity's perimeter. The number of vents 12 should be selected to provide adequate venting to all parts of the mold cavity 2. The vents 12 may be positioned as needed to provide adequate venting. The depth and length of the vents 12 should be selected to minimize pressure drop and the formation of flash on the finished composite. Any flash formed on the composite can be removed after curing or post-curing.

The following examples are given to demonstrate the present invention without limiting the invention's broad scope.

EXAMPLE 1

272 g of a molding compound were dried in an oven at 150° C. (300° F.) for 30 min. The molding compound comprised 65 wt % of a partially imidized PMR-15 resin powder, 30 wt % of 1 mm long chopped IM-S carbon fibers (Grafil Co., Pittsburg, Calif.), and 5 wt % of granular graphite powder having a nominal diameter of 10 $\mu$m. The molding compound was purchased from Dexter Composites (Cleveland, Ohio). While the molding compound was dried, a molding apparatus, including a material reservoir, transfer ram, and molding tool, was preheated to a molding temperature of 300° C. (575° F.).

The preheated molding compound was placed into the material reservoir where it softened to become a viscous material. The transfer ram applied 24.1 MPa (3.5 ksi) pressure to transfer the viscous molding compound from the material reservoir into mold cavities in the molding tool at a rate of 200 g/min. The transfer was completed within 82 seconds to provide a heat-up rate of 110° C./min (200° F./min). The molding tool, shown in the Figure, had two mold cavities shaped to produce gas turbine compressor inner shroud segments. Each cavity was 20.3 cm (8 inches) long and had a perimeter of about 42.2 cm (17 inches). Each cavity had 13 vents, each of which was about 6 mm (0.25 inch) wide, about 0.25 mm (0.01 inch) deep, and between about 12.7 mm (0.5 inch) to about 25.4 mm (1 inch) long. The vents allowed air and volatiles trapped or produced in the molding tool to escape.

After the molding compound was transferred into the mold cavities, it was held under 24.1 MPa and 300° C. for 1.5 hr to allow it to cure into inner shroud segments. After curing, the segments were cooled to 205° C. (400° F.) and removed from the tool. The segments were then post-cured at atmospheric pressure by heating them to 315° C. (600° F.) at a rate of 3° C. (5° F.)/hr. The heat-up rate allowed residual volatiles in the segments to diffuse out of the matrix. The segments were held at 315° C. for 16 hr to ensure that all volatiles were removed and then cooled. Visual, microstructural, and x-ray examinations of the inner shroud segments showed that they were substantially free of microcracks and blisters.

EXAMPLE 2

272 grams of the molding compound from Example 1 were dried as in Example 1. The molding apparatus was preheated to a molding temperature of 330° C. (625° F.). The molding compound was placed into the material reservoir and transferred into the molding tool under a pressure of 20.7 MPa (3 ksi) at a rate of 200 g/min. The transfer was completed within 82 seconds to provide a heat-up rate of about 132° C./min (238° F./min). Once the mold cavities in the tool were packed with the molding compound, the transfer ram was withdrawn for 30 seconds to decrease the pressure in the mold cavities. This allowed air and volatiles trapped in the mold cavities to escape. The transfer ram then reapplied 20.7 MPa of pressure. The molding compound was held at 20.7 MPa and 330° C. for 1 hr to allow the molding compound to cure into inner shroud segments. After curing, the segments were cooled to 205° C. (400° F.), removed from the tool, and post-cured as in Example 1. Visual, microstructural, and x-ray examinations of the inner shroud segments showed that they were substantially free of microcracks and blisters.

The composites of the present invention can be used for a variety of applications in the aerospace and other industries. For example, the composites can be used in gas turbine engines as inner shrouds, vane platforms, bleed nozzles, or similar applications.

The present invention provides several benefits over the prior art. The short carbon fibers in the composite provide adequate matrix reinforcement while inhibiting the formation of matrix microcracks. Blistering is reduced by efficiently removing volatiles produced during cure through well-placed vents in the molding tool. The slow, controlled post-cure heat-up rates further reduce microcracking and blistering by allowing volatiles to diffuse from the matrix. In addition, the rapid cure and ability to maintain the molding apparatus at a constant temperature throughout an entire part run combine to produce molding cycles that are up to 5 times shorter than prior art compression molding and transfer molding cycles.

The invention is not limited to the particular embodiments shown and described herein. Various changes and modifications may be made without departing from the spirit or scope of the claimed invention.

We claim:

1. A method of making substantially microcrack-free and blister-free composites by transfer molding, comprising the steps of:
    (a) drying a molding compound that comprises a mixture of a partially imidized polyimide resin and a plurality of carbon reinforcing fibers that are less than 3 mm long to remove excess moisture,
    (b) heating a transfer molding apparatus to a molding temperature sufficient to cure the molding compound into a desired composite, wherein the transfer molding apparatus includes a material reservoir, a transfer ram, and a molding tool that has a plurality of vents connected to a passage that permit volatiles in the molding tool to escape from the molding tool,
    (c) placing the molding compound into the heated material reservoir to heat the molding compound to a temperature at which the molding compound softens into a viscous material, wherein the temperature at which the molding compound softens into a viscous material is less than the molding temperature, (d) transferring the viscous molding compound from the material reservoir to a mold cavity in the heated molding tool with the heated transfer ram to establish a molding pressure in the mold cavity sufficient to cure the molding compound into the desired composite within a convenient time, wherein the viscous molding compound is transferred to the mold cavity such that the viscous molding compound is heated to the molding temperature at a rate of at least about 85° C./min, (e) maintaining the molding pressure and temperature in the mold cavity for a time sufficient to cure the molding compound into the desired composite, wherein volatiles produced while the molding compound cures are removed through the vents in the molding tool, (f) cooling the cured composite to a temperature suitable for starting a post-cure procedure, (g) heating the cured composite to a suitable post-cure temperature at a rate sufficient to permit residual volatiles in the composite to diffuse from the composite, (h) maintaining the cured composite at the post-cure temperature for a time sufficient to ensure that residual volatiles are removed from the composite, and (i) cooling the cured composite.

2. The method of claim 1, wherein the molding compound is dried at a temperature between about 135° C. and about 163° C. for about 0.5 hr to about 4 hr.

3. The method of claim 1, wherein the molding temperature is about 300° C. to about 330° C. and the transfer ram applies a pressure of at least about 13.8 MPa.

4. The method of claim 1, wherein the rate at which the viscous molding compound is heated to the molding temperature is at least about 110° C./min.

5. The method of claim 1, wherein the molding pressure and temperature are maintained for about 0.5 hr to about 2 hr to produce the cured composite.

6. The method of claim 1, wherein the cured composite is heated to a post-cure temperature of about 315° C. at a rate of about 2° C./hr to about 7° C./min.

7. The method of claim 1, further comprising by momentarily releasing the pressure in the mold cavity after step (d) to permit air and volatiles trapped in the mold cavity to escape and reestablishing the molding pressure before step (e).

8. The method of claim 7, wherein the pressure in the mold cavity is released for up to about 45 sec.

* * * * *